Patented July 16, 1935

2,007,983

UNITED STATES PATENT OFFICE 2,007,983

PRETREATED NATURAL RESIN AND METHOD OF UTILIZING THE SAME

Israel Rosenblum, Jackson Heights, N. Y.

No Drawing. Application August 25, 1932, Serial No. 630,428

5 Claims. (Cl. 260—4)

The present invention relates to a novel pretreatment for an acidic natural resin whereby its acidity is reduced, and to the production of oil-soluble synthetic resins with such pre-treated natural resin.

It is known to produce oil-soluble resins containing a condensation product of a phenol and an aldehyde and having a comparatively low acid number, by condensing phenol and formaldehyde at temperatures of about 100° C. in the presence of rosin or other natural resin and then neutralizing the mass at higher temperatures with a polyhydric alcohol, such as glycerol. In such known process the phenol and formaldehyde condense readily in the presence of the rosin at a comparatively low temperature, the water and excess formaldehyde being driven off after the condensation has gone as far as it can be made to go under practical conditions, the mass being then heated with glycerol to neutralize the same. I have now found that if the natural resin, and particularly colophony, is first treated with a carbonyl-containing compound, and especially formaldehyde, at high temperatures, the acidity of the natural resin is reduced to a very considerable degree while the resinous mixtures obtained by causing a phenol and a carbonyl-containing compound to condense in the presence of such pre-treated resin has not only a lower acid number but also other improved properties as compared with a resin made under similar conditions with a natural resin not so pre-treated.

According to the present invention, an acidic natural resin, such as rosin, is treated with an aqueous or solid aldehyde (e. g. paraformaldehyde) with or without pressure by heating these materials slowly to a temperature of about 250° C. or above. The time required to reach this temperature will depend upon the mass of the mixture. I prefer to keep the mixture at the maximum temperature for about two hours, although it may be subjected to such temperature for longer or shorter periods depending upon the conditions under which the treatment takes place. I have found that by such treatment the acid number of the rosin may be reduced from about 178 to about 135 and even lower, the acidity falling along an almost straight line. Thus upon heating rosin with about 5% of its weight of formaldehyde, the acid number of the rosin falls from about 175 at 140° C. to 164 at 160° C., 153 at 190° C., 145 at 220° C., and 135 at 250° C. During the treatment a part of the formaldehyde is driven off, but a certain amount of such compound appears to remain with the rosin. Thus, I have found that when rosin is heated with formaldehyde to 250° C. and kept at such temperature for two hours, about 1% of formaldehyde based upon the weight of the rosin, is retained by the latter. Whether the formaldehyde is chemically combined with the rosin or is only in physical admixture therewith, I am not prepared to say; it appears however that, in view of the reduction of the acid number, which is far more than can be accounted for by the mere heating of the resin (the acidity of an acidic natural resin is slightly reduced by dry-distilling or cracking), and in view also of the fact that prolonged heating at 250° C. does not expel the remaining portion of formaldehyde, a chemical combination of some kind has taken place.

A natural resin so pretreated may with advantage be employed in association with synthetic resins. Thus a phenol, substituted or unsubstituted or mixtures of the same, and a carbonyl-containing compound may be condensed at about 100° C. in the presence of the formaldehyde-treated rosin at atmospheric pressure or at a slightly higher temperature at super-atmospheric pressure. After the initial condensation is substantially completed the water and unreacted volatile material are driven off with or without the aid of vacuum. The mass is then slowly further heated and is neutralized by esterification with a polyhydric alcohol or with a partial ester of a polyhydric alcohol. While the polyhydric alcohol may be added to the mixture of phenolic condensate and rosin at high temperatures, e. g. about 250° C., I prefer to add the same at about 160° C.; if desired, the alcohol may be mixed with the phenol, aldehyde, and rosin at the beginning of the reaction. It appears that at the lower temperatures the phenolic condensate is in a more reactive state, while the polyhydric alcohol tends to form larger quantities of partial esters with the rosin, so that the formation of mixed polyhydric alcohol esters of the phenolic condensate, which is acidic in character, and of the rosin is promoted. Whatever the true nature of the chemical reactions involved may be, I have found that resins of better viscosity in solution and lower acid number are obtained by causing the alcohol to act at lower temperatures, e. g. 160°–180° C.

The condensation of the phenol and aldehyde may take place in the presence or absence of a catalyst; I prefer, however, to employ a catalyst in the form of a zinc compound such as zinc oxide, hydroxide, acetate, benzoate, abietate, stearate, oleate, palmitate, tungate. Any of the corresponding compounds of calcium, barium, strontium, lead, cobalt, nickel, manganese etc. may also be used. The compounds of the alkali metals may be used but do not usually give the best results.

The natural resin can be pre-treated with the formaldehyde under elevated, normal or reduced pressures in the presence of a solvent, such as mineral spirits, turpentine, toluol, xylol etc., which can be expelled at elevated temperatures. The great reduction in the acidity of rosin, for example, by treatment with formaldehyde at elevated temperatures will be evident from the following experiment:

Example 1

10 lbs. of commercial rosin having an acid number of 178 were heated with 5% of formaldehyde, based upon the weight of rosin, in the form of the 40% aqueous solution. The mixture was kept under pressure until the temperature of 110° C. was reached. The temperature was then slowly raised, water and excess formaldehyde escaping until the temperature of 250° C. was reached. The mass was kept at this temperature for four or more hours. At the end of four hours at 250° C. the acid number was found to be 135. The gradual reduction in the acid number of the rosin began at a temperature of about 160° C., the acid number falling along almost a straight line to a value of 135 at 250° C.

The so pre-treated rosin or other acidic natural resin is, as above indicated, advantageously employed for the production of oil-soluble phenol-aldehyde resins of low acid number. The phenol, aldehyde and natural resin are mixed and heated at a temperature of 100 to 130° C. with or without pressure for several hours. The temperature is gradually raised to remove water and uncombined phenol and aldehyde. The dehydration is complete at about 160° C. At this temperature vacuum can be applied for a few hours to expel the last portions of volatile material, especially uncombined phenol. With the temperature still at 160° C. an amount of glycerol equivalent to about 9% of the weight of rosin is added and the temperature is then slowly raised to 250° C. during a period of about four hours and the esterification completed at this temperature. The mixture may be agitated during the heating and either vacuum or pressure may be applied as desired.

My invention will be described in greater detail with the aid of the following examples which are given by way of illustration only and are not to be construed as defining the limits of the invention.

Example 2

1000 parts of formaldehyde pre-treated rosin, 85 parts phenol and 68 parts paraformaldehyde are condensed up to a temperature of about 130° C. The mass is then dehydrated up to about 160° C. and kept at this temperature under vacuum for about five hours. 90 parts of glycerol are then stirred in and the temperature slowly raised during about four hours to 250° C. and the mass maintained at such latter temperature until a product having the desired properties is obtained.

Example 3

1000 parts of formaldehyde pre-treated rosin, 131 parts of phenol and 158 parts of aqueous formaldehyde (corresponding to 63 parts of formaldehyde) are condensed under pressure at 110° C. and the mass then dehydrated up to about 160° C. 90 parts of glycerine are added at this temperature and the mass slowly brought to 250° C. and maintained at such temperature until a resinous mass of low acid number (about 8) is obtained.

Example 4

1000 parts of formaldehyde pre-treated rosin, 170 parts of phenol and 81 parts of paraformaldehyde are heated and esterified with 90 parts of glycerine as above described. A mass is obtained which, in spite of the increased content of phenolic resin, is soluble in oil and is of low acid number.

Example 5

1000 parts of formaldehyde pre-treated rosin, 150 parts of amyl phenol and 82 parts of paraformaldehyde are condensed at 120° C. until a resinous phenol-formaldehyde condensate is obtained and the mass then dehydrated up to 160° C. There are then added 90 lbs. of glycerol and the heating continued as above.

Example 6

1000 parts of formaldehyde pre-treated rosin, 50 parts of amyl phenol, 50 parts of (ordinary) phenol and 38 parts of paraformaldehyde are condensed according to any of the procedures above described and then esterified with 90 parts of glycerine which are added at about 160° C., after which the temperature is slowly raised to about 250° C. and maintained at such temperature until a homogeneous resin of low acid number is obtained.

Example 7

1000 parts of formaldehyde pre-treated rosin, 75 parts of amyl phenol, 75 parts of (ordinary) phenol and 57 parts of paraformaldehyde are treated as above described and yield a resin of low acid number and excellent solubility in oils.

In all of the above examples a catalytic agent may be employed, such as a small quantity of zinc oxide.

The resins obtained in accordance with the invention are characterized by an unusually low acid number, the phenol-aldehyde condensate, which is acidic in nature, appearing to have a lower acid number when produced in accordance with the above examples. The resinous products obtained are also harder and more alkali-proof than similar resins heretofore produced from a phenol-aldehyde condensate, rosin and glycerol.

The phenol employed may be ordinary phenol, a substituted phenol, preferably in the para position, such as cresol, amyl phenol, butyl phenol, phenyl phenol, etc., or mixtures of such phenols.

The formaldehyde for pre-treating the natural resin may be replaced in whole or in part by other aldehydes, such as acetaldehyde, or by ketones, such as acetone, but the use of formaldehyde is preferred. The action of the formaldehyde on the natural resin becomes noticeable at about 140° C. and increases steadily from this temperature to about 250° to 260° C.

In place of glycerol other alcohols, preferably polyhydric, may be used, e. g., glycol, mannitol, etc. Other variations may be resorted to within the scope of the appended claims without departing from the spirit of the invention.

I claim:

1. The method which comprises heating rosin with formaldehyde at a temperature of about 250° C. until the acidity of the rosin has been reduced to about 135, adding a phenol and an aldehyde to such pre-treated rosin and heating the mass to effect condensation of the phenol and aldehyde, adding a polyhydric alcohol in quantities sufficient substantially to neutralize the mass, and heating the mixture at about 260° C. until the reaction is substantially completed and a fusible, soluble, resinous mass is obtained.

2. The method which comprises heating rosin with formaldehyde up to temperatures of about 250° C. until the acid number of the resin is about 135 or below, cooling the rosin and adding thereto a phenol and formaldehyde, heating the mixture at approximately 100 to 130° C. until the phenol and formaldehyde are condensed, raising the temperature to approximately 160° C., adding approximately 9% of glycerol based upon the weight of rosin, slowly raising the temperature to about 250° C., and continuing the heating at approximately such temperature until the reaction is substantially completed and a fusible, soluble, resinous reaction product is obtained.

3. The method which comprises heating rosin with formaldehyde to about 250° C. until the acid number of the rosin has been reduced to about 135, mixing such pre-treated rosin with a phenol substituted by a hydrocarbon radical of the group consisting of saturated aliphatic radicals having more than one carbon atom and of aromatic radicals, and formaldehyde, and heating the mass to effect condensation of the phenol and formaldehyde, adding a polyhydric alcohol in quantities sufficient substantially to neutralize the mass and heating the mixture at about 260° C. until the reaction is substantially completed and a fusible, soluble, resinous mass is obtained.

4. A product of the process defined in claim 1.

5. A product of the process defined in claim 3.

ISRAEL ROSENBLUM.